US 6,609,588 B2

(12) United States Patent
Mielke et al.

(10) Patent No.: US 6,609,588 B2
(45) Date of Patent: Aug. 26, 2003

(54) METHOD OF FORMING MOUNTING FEATURES OF ELECTRIC STEERING HOUSING

(75) Inventors: Dean W. Mielke, Sterling Heights, MI (US); Joseph D. Miller, Farmington Hills, MI (US)

(73) Assignee: TRW Inc., Lyndhurst, OH (US)

( * ) Notice: Subject to any disclaimer, the term of this patent is extended or adjusted under 35 U.S.C. 154(b) by 0 days.

(21) Appl. No.: 09/826,516

(22) Filed: Apr. 4, 2001

(65) Prior Publication Data

US 2002/0144854 A1 Oct. 10, 2002

(51) Int. Cl.[7] ............................................... B62D 5/04
(52) U.S. Cl. .................................. 180/444; 74/388 PS
(58) Field of Search ................................ 180/443, 444, 180/446; 74/388 PS, 89.23, 127, 606 R, 424.83; 310/89, 91

(56) References Cited

U.S. PATENT DOCUMENTS

| | | | |
|---|---|---|---|
| 4,577,715 A | * | 3/1986 | Saito |
| 5,285,864 A | | 2/1994 | Martin et al. |
| 5,555,951 A | | 9/1996 | Sugino et al. |
| 5,573,079 A | | 11/1996 | Suda et al. |
| 5,864,189 A | * | 1/1999 | Kodaira et al. |
| 5,975,234 A | | 11/1999 | Bogosh et al. |
| 5,988,005 A | | 11/1999 | Onodera et al. |
| 6,006,854 A | * | 12/1999 | Nakajima ................... 180/446 |
| 6,119,345 A | * | 9/2000 | Lydic et al. |
| 6,244,374 B1 | * | 6/2001 | Tomita et al. .............. 180/446 |
| 6,293,164 B1 | * | 9/2001 | Krause |

* cited by examiner

Primary Examiner—Anne Marie Boehler
(74) Attorney, Agent, or Firm—Tarolli, Sundheim, Covell & Tummino L.L.P.

(57) ABSTRACT

A vehicle steering assembly (10) comprises a steering member (14) having a rack portion (36) for engagement with a pinion (30) and a screw portion (38). A ball nut (90) cooperates with the screw portion (38) to move the steering member (14) axially upon rotation of the ball nut (90). An electric motor (50) is drivingly connected to the ball nut (90). The member (38) has an additional portion (142) projecting from the ball nut (90) for connection with a steerable vehicle wheel. The assembly (10) includes a cold-formed metal housing (60) having a generally cylindrical main body portion (120) enclosing and supporting the electric motor (50) and the ball nut (90) and a generally cylindrical outboard housing portion (140) enclosing the additional portion (142) of the member (38). The housing (60) has structure associated with the outboard portion (140) for mounting the assembly (10) to the vehicle.

12 Claims, 4 Drawing Sheets

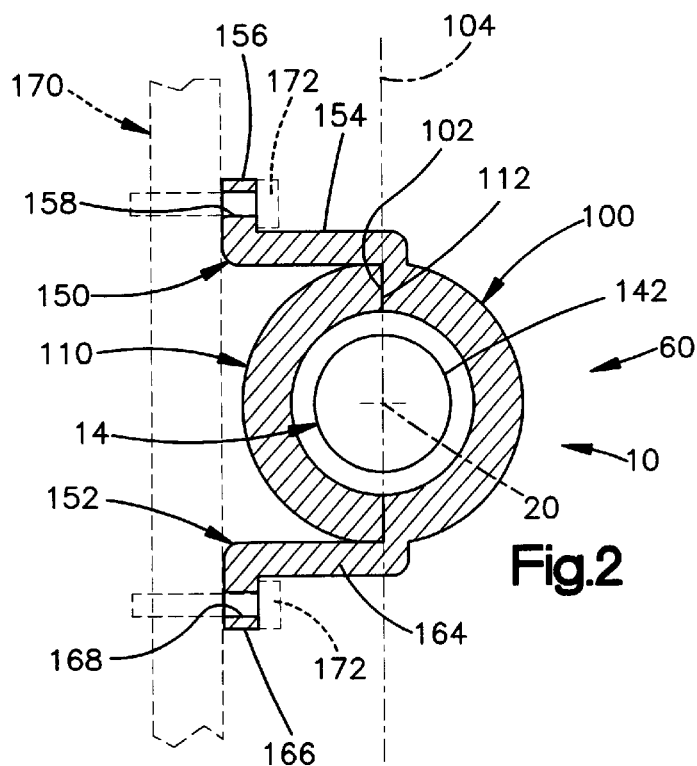
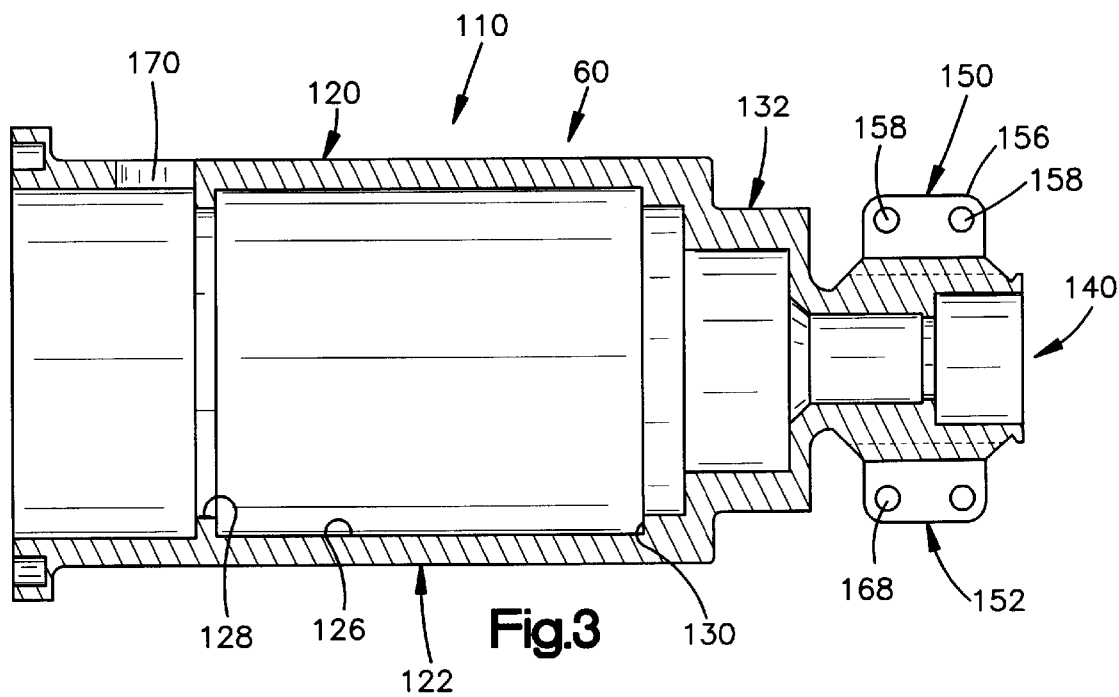

METHOD OF FORMING MOUNTING FEATURES OF ELECTRIC STEERING HOUSING

BACKGROUND OF THE INVENTION

1. Technical Field

The present invention relates to a vehicle power assist steering system. In particular, the present invention relates to a method of forming the mounting features of a housing of an electric power assist steering system.

2. Description of the Prior Art

A known type of vehicle power assist steering system includes a ball nut for transmitting force between a steering member and an electric assist motor. Upon actuation of the electric motor, the ball nut is driven to rotate relative to the steering member. The rotational force of the ball nut is transmitted to the steering member to drive the steering member axially. Axial movement of the steering member effects turning movement of the steerable wheels of the vehicle.

The steering system typically includes a housing that contains most of the components of the steering system. The housing is cast from a metal, such as aluminum. The housing, as cast, can include one or more mounting features, such as tabs or mounting feet, for mounting the steering system to the vehicle body.

SUMMARY OF THE INVENTION

The present invention is a method of making a steering assembly for turning steerable wheels of a vehicle in response to rotation of a steering wheel of the vehicle. The method comprises the steps of:

providing a pinion;

providing a steering member that is movable axially to effect turning movement of the steerable wheels of the vehicle, the steering member having a rack portion for engagement with the pinion and an externally threaded screw portion;

providing a ball nut cooperating with the screw portion to move the steering member axially upon rotation of the ball nut;

providing an electric motor comprising a stator and a rotor drivingly connected to the ball nut to rotate the ball nut when the motor is energized;

said step of providing a steering member comprising providing a steering member having an additional portion projecting from the ball nut for connection with a steerable wheel of the vehicle; and cold forming a metal housing having a generally cylindrical main body portion for enclosing and supporting the electric motor and the ball nut and having a generally cylindrical outboard housing portion for enclosing the outboard portion of the steering member;

said cold forming step comprising cold forming a metal housing having a plurality of mounting feet formed with the outboard portion of the housing and projecting from the outboard portion of the housing for mounting the steering assembly to the vehicle;

enclosing and supporting the electric motor and the ball nut in the main body portion of the metal housing; and enclosing the additional portion of the steering member in the outboard portion of the metal housing.

BRIEF DESCRIPTION OF THE DRAWINGS

The foregoing and other features of the present invention will become apparent to one skilled in the art to which the present invention relates upon consideration of the following description of the invention with reference to the accompanying drawings, in which:

FIG. 2 is an enlarged transverse sectional view of an outboard housing portion of the housing of FIG. 1 and showing two mounting feet for mounting the steering system to a vehicle portion shown in phantom in FIG. 2;

FIG. 3 is a side elevational view of one piece of the motor housing of FIGS. 1 and 2, showing the mounting feet in elevation;

DESCRIPTION OF A PREFERRED EMBODIMENT

Figure 1:
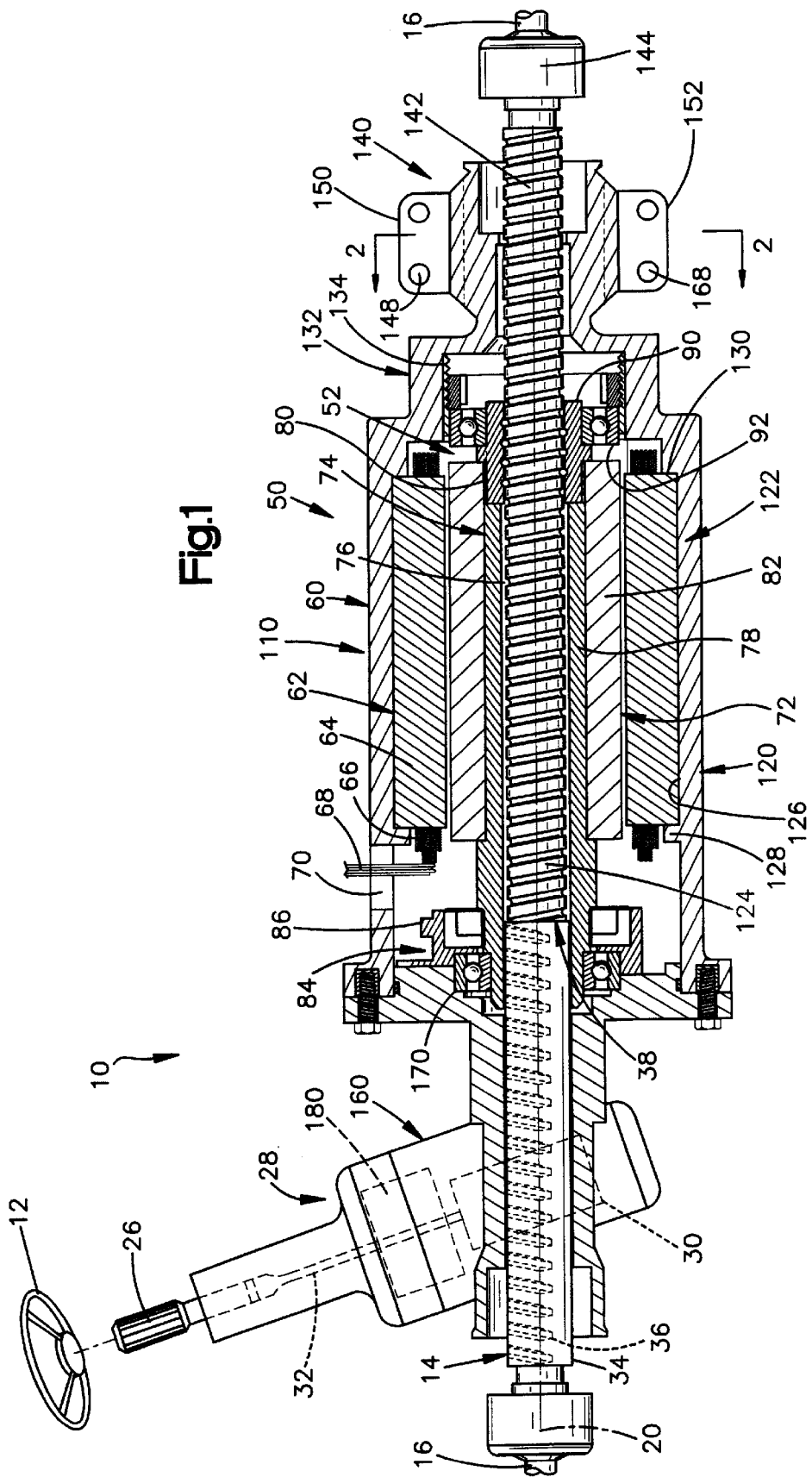
FIG. 1 is a view, partially in section, of a steering system including an electric assist motor with a two-piece motor housing in accordance with a first embodiment of the invention.

The present invention relates to a power assist steering system. In particular, the present invention relates to an electric power assist steering system which includes an electric assist motor for applying force to a steering member, such as a rack. As representative of the present invention, FIG. 1 illustrates a power assist steering system 10.

The steering system 10 includes a driver-operated steering wheel 12 operatively connected to a steering member 14. The steering member 14 is coupled with the steerable wheels (not shown) of a vehicle through tie rods 16. The steering member 14 extends along an axis 20 of the steering system 10.

The vehicle steering wheel 12 is connected for rotation with an input shaft 26, which extends into a pinion housing 28. The input shaft 26 is mechanically coupled by a torsion bar 32, in a known manner, to a pinion gear 30 located in the pinion housing 28.

The steering member 14 includes a first portion 34 having rack teeth 36 disposed thereon and a second portion 38 having an external screw thread convolution axially spaced from the rack teeth. The rack teeth 36 on the steering member 14 are in meshing engagement with gear teeth (not shown) on the pinion gear 30.

The steering system 10 includes an electric assist motor 50, described below in detail. The steering system includes a motor housing 60 (described below in detail), which houses most of the components of the motor. The motor housing 60 and the pinion housing 28, together, form a housing of the steering assembly 10.

The motor 50 is drivably connected to a ball nut assembly 52 for effecting axial movement of the steering member 14 upon rotation of the vehicle steering wheel 12. In the event of inability of the motor 50 to effect axial movement of the steering member 14, the mechanical connection between the gear teeth on the pinion gear 30 and the rack teeth 36 on the steering member 14 can effect manual steering of the vehicle.

The motor 50 includes a stator 62. The stator 62 includes a metal core 64 formed of a plurality of stacked laminations which are laser welded together to form the core. The stator 62 also includes a series of stator windings 66 disposed in slots in the core 64. The windings 66 form magnetic poles of the motor 50.

The stator windings 66 have leads 68 (FIGS. 2 and 4) for connection with motor actuation circuitry of the vehicle. End portions of the leads 68 extend out of the motor housing 60, through an opening 70, for connection with the vehicle electric circuitry.

A rotor assembly 72 is disposed radially inward of the stator 62. The rotor assembly 72 includes a tubular, cylindrical rotor shaft 74 having a cylindrical central passage or opening 76. The rotor shaft 74 has a main body portion 78 and a thin-walled end portion 80. A rotor 82 is press fit on the outside of the rotor shaft 74. The motor 50 also includes a motor position sensor indicated schematically at 84 (FIG. 1) adjacent the left end (as viewed in FIG. 1) of the rotor shaft 74.

The ball nut assembly 52 includes a ball nut 90, which is press fit inside the right end portion 80 of the rotor shaft 74. The ball nut 90 has an internal screw thread convolution. A first bearing 92 is press fit onto the ball nut 90.

The motor housing 60 (FIGS. 1–3) is cold formed from metal in a manner described below. A preferred material for the motor housing 60 is aluminum or an aluminum alloy. Steel may also be used.

In the embodiment illustrated in FIGS. 1–3, the motor housing 60 comprises a first housing piece 100 and a second housing piece 110 (FIG. 2) that are joined together in a suitable manner, such as by roller seam welding. Alternatively, the first and second housing pieces 100 and 110 may be sealed together in a known manner with removable fasteners (not shown) for disassembly of the motor 50.

Specifically, the illustrated housing 60 has a clamshell configuration including similar first and second housing pieces 100 and 110 that have mating surfaces 102 and 112, respectively, in mating engagement with each other. Each one of the first and second housing pieces 100 and 110 extends for 180 degrees around the axis 20.

The first and second housing pieces 100 and 110 are substantially mirror images of each other and are joined to each other along a joining plane 104 (FIG. 2). The first housing piece 100 additionally has a pair of mounting feet 150 and 152 as described below, that are not present on the second housing piece 110.

The motor housing 60 is described below as having a plurality of portions, such as a main body portion 120 and an outboard housing portion 140. Each one of these portions of the housing 60, described below, is formed of axially coextensive 180 degree sections of the first and second housing pieces 100 and 110 that together form a 360 degree section of the motor housing.

The housing 60 has a generally cylindrical main body portion 120. The main body portion 120 encloses and supports the electric motor 50 and the ball nut 90.

The main body portion 120 of the motor housing 60 includes a stator support portion 122 disposed adjacent to the pinion housing 28 and to the pinion 30. The stator support portion 122 of the motor housing 60 encloses a primary portion 124 of the externally threaded portion 38 of the steering member 14. The stator support portion 122 has a cylindrical inner side surface 126 that supports the stator 62 radially. A first locating flange 128 extends inward from the inner side surface 126, at a location near the inboard end of the motor housing 60. A second locating flange 130 extends inward from the inner side surface 126, at a location near the outboard end of the motor housing 60. The flanges 128 and 130 cooperate to block axial movement of the stator 62 in a direction to the left or right as viewed in FIGS. 1 and 3.

The main body portion 120 of the motor housing 60 also includes an end cap portion 132 that supports the ball nut assembly 52. The end cap portion 132 is smaller in diameter than the stator support portion 122. A metal insert 134 is press fitted in the end cap portion 132. The metal insert 134 (FIG. 2) has a cylindrical bearing surface centered on the axis 20. An internal spanner nut thread is formed on the metal insert 134 at a location axially outward of the bearing surface.

A generally cylindrical outboard housing portion 140 of the motor housing 60 closes the right end (as viewed in FIG. 1) of the motor 50. The outboard housing portion 140 encloses an additional portion 142 of the steering member 14. The additional portion 142 of the steering member 14 extends from the primary portion 124 and projects axially from the outboard housing portion 140 of the motor housing 60. A ball joint 144 connects the steering member 14 with the tie rod 16.

The housing 60 has a plurality of mounting feet for mounting the system 10 to the vehicle. In the illustrated embodiment, the housing includes two mounting feet 150 and 152. The mounting feet 150 and 152 are formed with the outboard housing portion 140 of the motor housing 60. The mounting feet 150 and 152 project from the outboard portion 140 of the housing 60 for mounting the steering assembly 10 to the vehicle.

In the embodiment of FIGS. 1–3, the mounting feet 150 and 152 are formed as one piece with the first housing piece 100. The first and second mounting feet 150 and 152 are located diametrically opposite each other when the first and second housing pieces 100 and 110 are in mating engagement with each other to form the housing 60.

The first mounting foot 150 extends from the mating surface 102 of the first housing piece 100. The first mounting foot 150 has an L-shaped configuration including a first leg 154 that extends tangentially from the outboard housing portion 140 and a second leg 156 that extends perpendicularly from the first leg 154. The second leg 156 is substantially shorter than the first leg 154, in the illustrated embodiment. A plurality of fastener openings 158 are formed in the second leg 156. The fastener openings 158 extend transverse to the second leg 156 and parallel to the first leg 154.

The second mounting foot 152 is a mirror image of the first mounting foot 150, about a plane that extends through the axis 20. The second mounting foot 152 has an L-shaped configuration including a first leg 164 that extends from the outboard housing portion 140 and a second leg 166 that extends perpendicularly from the first leg 164. The second leg 166 is substantially shorter than the first leg 164, in the illustrated embodiment. A plurality of fastener openings 168 are formed in the second leg 166. The fastener openings 168 extend transverse to the second leg 166 and parallel to the first leg 164.

The first legs 154 and 164 of the mounting feet 150 and 152 are long enough so that the second legs 156 and 166 can be placed against a vehicle portion (shown schematically at 170), such as the vehicle body, to secure the motor housing 60 to the vehicle portion. Fasteners shown schematically at 172, such as bolts, may be used to secure the mounting feet 150 and 152, and thereby the motor housing 60, to the vehicle portion 170.

The first and second housing pieces 100 and 110 are cold formed (cold worked). Cold forming involves forcing the metal to move into a new shape by plastic flow at room temperatures. Example of the types of cold forming that are usable here include drawing (specifically, impact extrusion); swaging (also know as cold forging), which involves squeezing a blank to an appreciably different shape; and stamping-hitting the blank to change its shape. The presence of the internal flanges 128 and 130 and other configuration features may limit the types of cold forming operations that are usable for a particular style of housing constructed in accordance with the invention. In the housing 60 illustrated in FIGS. 1–3, each one of the first and second housing pieces 100 and 110 may be formed using two piece progressive dies forcing metal out to form the mounting feet 150 and 152.

Upon rotation of the vehicle steering wheel 12 by the driver of the vehicle, the vehicle electric circuitry determines whether the motor 50 should be operated to provide steering assist to move the steering member 14. If the motor 50 is operated, the rotor 82 is caused to rotate about the axis 20 relative to the stator 62. The rotor shaft 74 and the ball nut 90 rotate with the rotor 82. The rotational force of the ball nut 90 is transmitted to the screw portion 38 of the steering member 14. Because the ball nut 90 is fixed in position axially, the steering member 14 is driven to move axially in response, effecting steering movement of the steerable wheels of the vehicle as desired.

Figure 4:
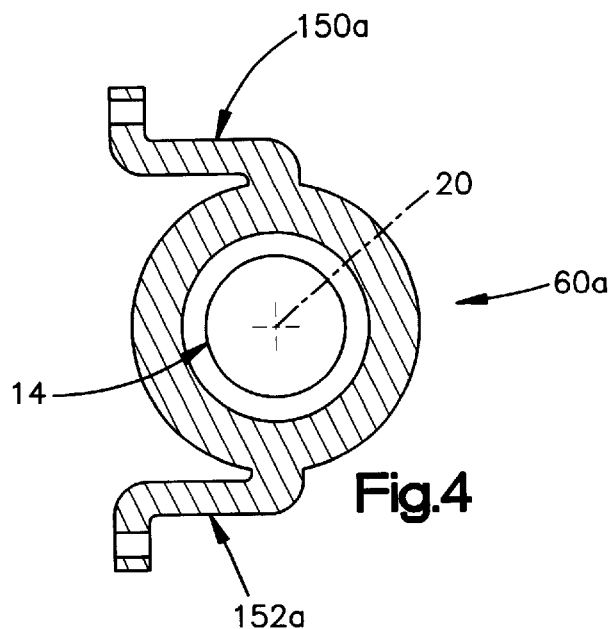
FIG. 4 is a transverse sectional view similar to FIG. 2 of an outboard housing portion of a one-piece housing in accordance with a second embodiment of the invention.
Figure 5:
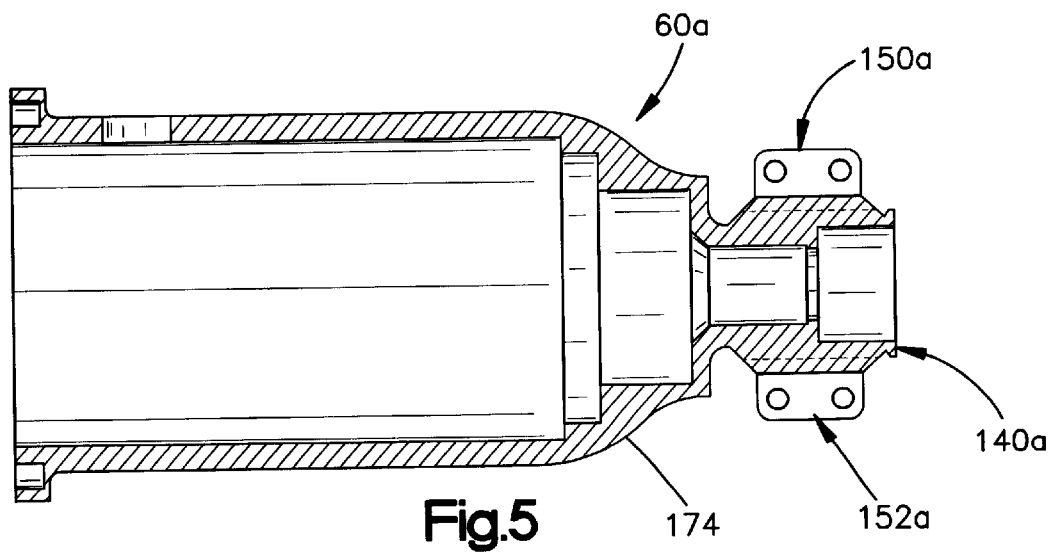
FIG. 5 is a longitudinal sectional view of the motor housing of FIG. 4, showing the mounting feet.

FIGS. 4 and 5 illustrate a motor housing 60*a* constructed in accordance with a second embodiment of the invention. The motor housing 60*a* may be substituted, in the steering assembly 10 (FIG. 1), for the motor housing 60.

The motor housing 60*a* (FIGS. 4 and 5) is a one-piece tube formed over a mandrel with cold flowed mounting feet. The mounting feet 150 and 152 are formed as one piece with the other portions of the housing 60*a*. The mounting feet 150*a* and 152*a* have a configuration similar to the configuration of the mounting feet 150 and 152 of the housing 60 (FIGS. 1–3).

Because the housing 60*a* is formed as one piece over a mandrel, it is necessary to be able to remove the mandrel after forming. Therefore, the internal flanges 128 and 130 of the housing 60 (FIGS. 1–3) are not present in the housing 60*a* of FIGS. 4 and 5. The stator 62 of the motor 50 may be press fitted in the housing 60*a*. In addition, the exterior of the housing 60*a* is rounded at 174. In other respects, the housing 60*a* is similar to the housing 60.

The housing 60*a* shown in FIGS. 4–5 may also be impact formed. In this case a trim die can be used with a restrike to flatten the mounting feet 150*a* and 152*a*.

Figure 6:
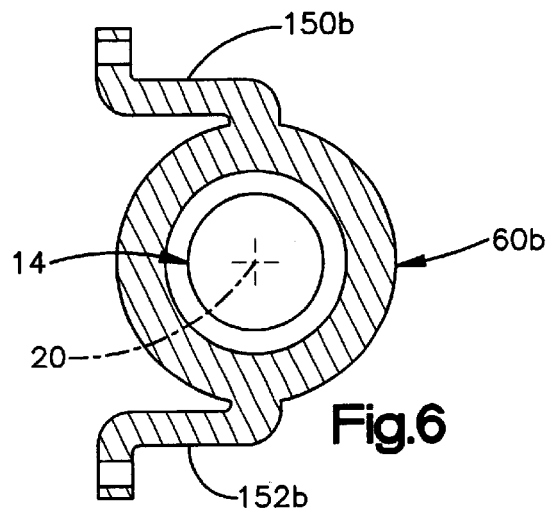
FIG. 6 is a transverse sectional view similar to FIG. 2 of an outboard housing portion of a one-piece housing in accordance with a third embodiment of the invention.
Figure 7:
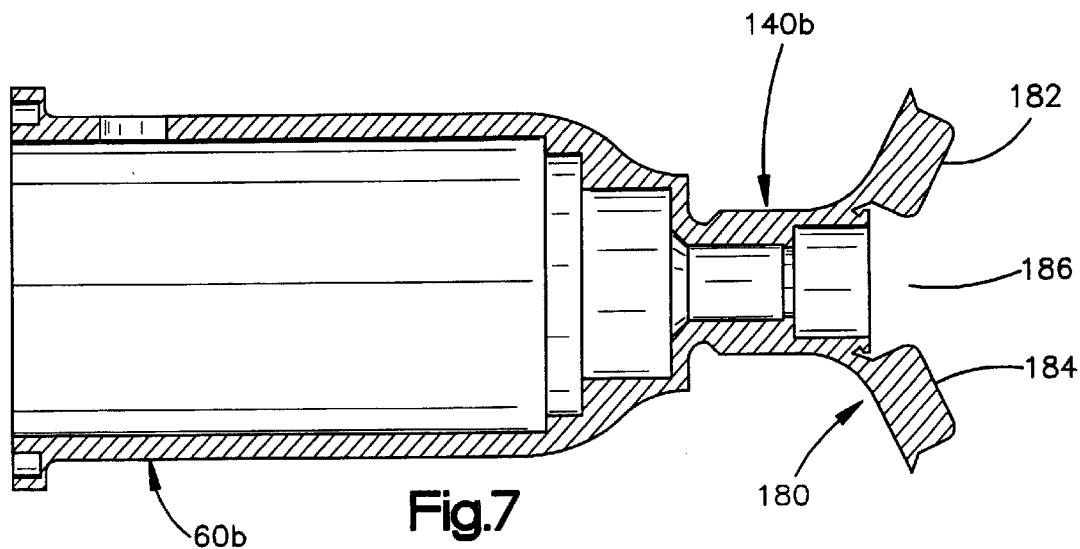
FIG. 7 is a longitudinal sectional view of the motor housing of FIG. 6, showing the mounting feet in a first condition prior to completion of formation of the motor housing.
Figure 8:
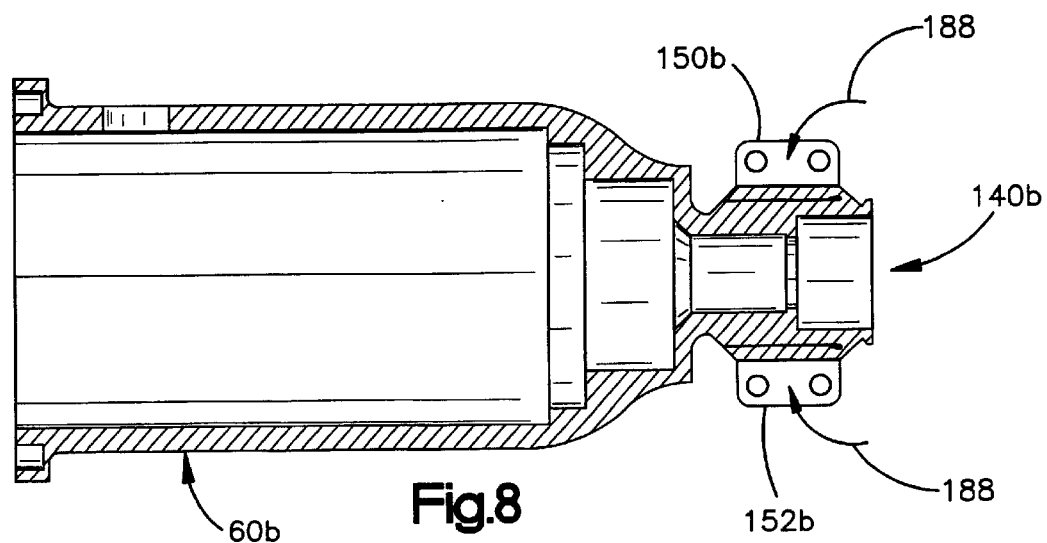
FIG. 8 is a view similar to FIG. 7, showing the mounting feet in a second condition upon completion of formation of the motor housing.

FIGS. 6–8 illustrate a motor housing 60*b* constructed in accordance with a third embodiment of the invention. The motor housing 60*b* may be substituted, in the steering assembly 10 (FIG. 1), for the motor housing 60.

The motor housing 60*b* (FIGS. 6–8) is a one-piece tube formed over a mandrel, like the motor housing 60*a* shown in FIGS. 4 and 5. The housing 60*b* includes an end portion 180 that is formed in a split configuration as shown in FIG. 7. The end portion includes first and second mounting foot portions 182 and 184 on opposite sides of slot 186.

The mounting foot portions 182 and 184 are formed as one piece with the other portions of the housing 60*b*. The mounting foot portions initially extend parallel to and are separated from each other by the slots 186. The mounting foot portions 182 and 184 are bent back as shown by the arrows 188 in FIG. 8, to form the mounting feet 150*b* and 152*b* of the housing 60*b*. The mounting feet 150*b* and 152*b* have a configuration similar to the configuration of the mounting feet of the housing (FIGS. 1–3).

From the above description of the invention, those skilled in the art will perceive improvements, changes and modifications in the invention. For example, the mounting feet of the motor housing can have a configuration different from that shown in the drawings. Such improvements, changes and modifications within the skill of the art are intended to be covered by the appended claims.

Having described the invention, we claim:

1. A steering assembly for turning steerable wheels of a vehicle in response to rotation of a steering wheel of the vehicle, said steering assembly comprising:

a pinion;

a steering member that is movable axially to effect turning movement of the steerable wheels of the vehicle, said steering member having a rack portion for engagement with said pinion;

a mechanism cooperating with said steering member to move said steering member axially upon actuation of said mechanism;

an electric motor comprising a stator and a rotor drivingly connected to said mechanism to actuate said mechanism when said motor is energized;

said steering member having an additional portion for connection with a steerable wheel of the vehicle; and a cold-formed metal housing having a generally cylindrical main body portion enclosing and supporting said electric motor and said mechanism and having a generally cylindrical outboard housing portion enclosing said additional portion of said steering member;

said outboard housing portion including at least one mounting foot having a first leg and a second leg, said first leg extending tangentially from said outboard housing portion, said second leg extending perpendicularly from said first leg such that said first leg and said second leg form an L-shaped configuration, said mounting foot being for mounting said steering assembly to the vehicle, said mounting foot being formed as one piece with said housing and not being a part separate from said housing.

2. A steering assembly as set forth in claim 1 wherein said outboard portion of said housing comprises at least two mounting feet formed with said outboard portion of said housing and projecting from said outboard portion of said housing.

3. A method of making a steering assembly for turning steerable wheels of a vehicle in response to rotation of a steering wheel of the vehicle, said method comprising the steps of:

providing a pinion;

providing a steering member that is movable axially to effect turning movement of the steerable wheels of the vehicle, the steering member having a rack portion for engagement with the pinion and an externally threaded screw portion;

providing a ball nut cooperating with the screw portion to move the steering member axially upon rotation of the ball nut;

providing an electric motor comprising a stator and a rotor drivingly connected to the ball nut to rotate the ball nut when the motor is energized;

said step of providing a steering member comprising providing a steering member having an additional portion projecting from the ball nut for connection with a steerable wheel of the vehicle; and cold forming a metal housing having a generally cylindrical main body portion for enclosing and supporting the electric motor and the ball nut and having a generally cylindrical outboard housing portion for enclosing the outboard portion of the steering member;

said cold forming step comprising cold forming a single piece of metal to form a metal housing piece including a plurality of mounting feet and at least a portion of the outboard portion of the housing, the mounting feet projecting from the outboard portion of the housing for mounting the steering assembly to the vehicle, each of said plurality of mounting feet a first leg and a second leg, each of the first legs extending tangentially from the outboard housing portion, each of the second legs extending perpendicularly from each corresponding first leg such that each of the plurality of mounting feet form an L-shaped configuration;

enclosing and supporting the electric motor and the ball nut in the main body portion of the metal housing; and enclosing the additional portion of the steering member in the outboard portion of the metal housing.

4. A method as set forth in claim 3 wherein said step of cold forming a metal housing comprises the step of forming the housing from a single tubular blank.

5. A method as set forth in claim 4 wherein said step of forming the housing from a single tubular blank includes a first step of forming the generally cylindrical main body portion of the housing over a mandrel and a second step of forming the mounting feet.

6. A method as set forth in claim 3 wherein said step of cold forming a metal housing comprises stamping the housing.

7. A method as set forth in claim 3 wherein said step of cold forming a metal housing comprises swaging the housing.

8. A steering assembly for turning steerable wheels of a vehicle in response to rotation of a steering wheel of the vehicle, said steering assembly comprising:

a pinion;

a steering member that is movable axially to effect turning movement of the steerable wheels of the vehicle, said steering member having a rack portion for engagement with said pinion and having an externally threaded screw portion;

a ball nut cooperating with said screw portion to move said steering member axially upon rotation of said ball nut;

an electric motor comprising a stator and a rotor drivingly connected to said ball nut to rotate said ball nut when said motor is energized;

said steering member having an additional portion projecting from said ball nut for connection with a steerable wheel of the vehicle; and a cold-formed metal housing having a generally cylindrical main body portion enclosing and supporting said electric motor and said ball nut and having a generally cylindrical outboard housing portion enclosing said additional portion of said steering member;

said housing having structure associated with said outboard portion of said housing for mounting said steering assembly to the vehicle;

wherein said structure comprises a plurality of mounting feet formed with said outboard portion of said housing and projecting from said outboard portion of said housing; and wherein said metal housing has a clamshell configuration including first and second housing pieces that have mating surfaces in mating engagement with each other, said mounting feet being formed at diametrically opposite locations on said first mounting piece.

9. A steering assembly for turning steerable wheels of a vehicle in response to rotation of a steering wheel of the vehicle, said steering assembly comprising:

a pinion;

a steering member that is movable axially to effect turning movement of the steerable wheels of the vehicle, said steering member having a rack portion for engagement with said pinion and having an externally threaded screw portion;

a ball nut cooperating with said screw portion to move said steering member axially upon rotation of said ball nut;

an electric motor comprising a stator and a rotor drivingly connected to said ball nut to rotate said ball nut when said motor is energized;

said steering member having an additional portion projecting from said ball nut for connection with a steerable wheel of the vehicle; and a cold-formed metal housing having a generally cylindrical main body portion enclosing and supporting said electric motor and said ball nut and having a generally cylindrical outboard housing portion enclosing said additional portion of said steering member;

said housing having structure associated with said outboard portion of said housing for mounting said steering assembly to the vehicle;

wherein said structure comprises a plurality of mounting feet formed with said outboard portion of said housing and projecting from said outboard portion of said housing; and wherein said metal housing is a one-piece cold-formed metal member including said main body portion and said outboard housing portion, said one-piece member having a split end portion including mounting feet portions that are bent back to said outboard housing portion to form said mounting feet.

10. A method of making a steering assembly for turning steerable wheels of a vehicle in response to rotation of a steering wheel of the vehicle, said method comprising the steps of:

providing a pinion;

providing a steering member that is movable axially to effect turning movement of the steerable wheels of the vehicle, the steering member having a rack portion for engagement with the pinion and an externally threaded screw portion;

providing a ball nut cooperating with the screw portion to move the steering member axially upon rotation of the ball nut;

providing an electric motor comprising a stator and a rotor drivingly connected to the ball nut to rotate the ball nut when the motor is energized;

said step of providing a steering member comprising providing a steering member having an additional portion projecting from the ball nut for connection with a steerable wheel of the vehicle; and cold forming a metal housing having a generally cylindrical main body portion for enclosing and supporting the electric motor and the ball nut and having a generally cylindrical outboard housing portion for enclosing the outboard portion of the steering member;

said cold forming step comprising cold forming a metal housing having a plurality of mounting feet formed with the outboard portion of the housing and projecting from the outboard portion of the housing for mounting the steering assembly to the vehicle;

enclosing and supporting the electric motor and the ball nut in the main body portion of the metal housing; and enclosing the additional portion of the steering member in the outboard portion of the metal housing;

wherein said step of cold forming a metal housing comprises the step of forming the housing from first and second housing pieces that are joined together in a clamshell configuration.

11. A method as set forth in claim 10 wherein said step of forming the housing from first and second housing pieces includes the step of forming the plurality of mounting feet on the first housing piece.

12. A method of making a steering assembly for turning steerable wheels of a vehicle in response to rotation of a steering wheel of the vehicle, said method comprising the steps of:

providing a pinion;

providing a steering member that is movable axially to effect turning movement of the steerable wheels of the vehicle, the steering member having a rack portion for engagement with the pinion and an externally threaded screw portion;

providing a ball nut cooperating with the screw portion to move the steering member axially upon rotation of the ball nut;

providing an electric motor comprising a stator and a rotor drivingly connected to the ball nut to rotate the ball nut when the motor is energized;

said step of providing a steering member comprising providing a steering member having an additional portion projecting from the ball nut for connection with a steerable wheel of the vehicle; and cold forming a metal housing having a generally cylindrical main body portion for enclosing and supporting the electric motor and the ball nut and having a generally cylindrical outboard housing portion for enclosing the outboard portion of the steering member;

said cold forming step comprising cold forming a metal housing having a plurality of mounting feet formed with the outboard portion of the housing and projecting from the outboard portion of the housing for mounting the steering assembly to the vehicle;

enclosing and supporting the electric motor and the ball nut in the main body portion of the metal housing; and enclosing the additional portion of the steering member in the outboard portion of the metal housing;

wherein said step of cold forming a metal housing comprises the step of forming the housing from a single tubular blank; and wherein said step of forming the housing from a single tubular blank includes the steps of forming an end portion of the housing with a split configuration defining two mounting foot portions, and thereafter bending the two mounting foot portions back to the outboard housing portion to form the mounting feet of the housing.

* * * * *